United States Patent [19]
Reiber

[11] Patent Number: 5,755,965
[45] Date of Patent: May 26, 1998

[54] CYCLONIC DE-GASSER

[75] Inventor: Harold Steven Reiber, Seattle, Wash.

[73] Assignee: HDR Engineering, Inc., Bellevue, Wash.

[21] Appl. No.: 543,601

[22] Filed: Oct. 16, 1995

[51] Int. Cl.$^6$ .................................................. B01D 45/16
[52] U.S. Cl. ...................... 210/512.1; 55/459.1; 96/212
[58] Field of Search ............................. 55/459.1, 459.2, 55/459.3, 459.4, 459.5; 96/209, 210, 212; 209/715, 717, 718, 719, 725, 726; 210/294, 295, 304, 322, 342, 512.1, 119, 121, 123, 128

[56] References Cited

U.S. PATENT DOCUMENTS

| | | |
|---|---|---|
| 3,161,490 | 12/1964 | Dudek . |
| 3,282,030 | 11/1966 | Griffo et al. . |
| 3,359,708 | 12/1967 | Barber . |
| 3,612,140 | 10/1971 | Mott ................................ 55/459.1 |
| 3,771,288 | 11/1973 | Wisman et al. . |
| 3,771,290 | 11/1973 | Stethem . |
| 4,940,473 | 7/1990 | Benham . |
| 5,203,891 | 4/1993 | Lema . |

FOREIGN PATENT DOCUMENTS

| | | |
|---|---|---|
| 1699496 | 12/1991 | U.S.S.R. . |
| 768537 | 2/1957 | United Kingdom . |

*Primary Examiner*—W. L. Walker
*Attorney, Agent, or Firm*—Christensen, O'Connor Johnson & Kindness PLLC

[57] ABSTRACT

The present invention is a gas/liquid separator which is employed to remove free gases from a liquid. The invention is comprised of two concentric cones with a tapering annulus therebetween. The liquid stream to be de-gassed enters a tangential fluid inlet under pressure and passes downwardly in the tapered annulus. The inner surface of the outer cone has a plurality of stator vanes which minimize turbulence of the liquid and maintains helical motion. The outer surface of the inner cone has a plurality of orifices to receive gas bubbles. The outer surface of the inner cone is preferably roughened to thicken the gas boundary layer of this surface such that gas bubbles are more readily trapped thereon. The unit imparts a downward helical motion to the liquid flow between the outer cone and the inner cone. The spiral motion of the liquid generates centripetal forces that cause the entrained bubbles to migrate toward the inner cone, where they are captured on the surface thereof and passed through the orifices therein where the gases are then vented to atmosphere through the top of the unit.

10 Claims, 2 Drawing Sheets

CYCLONIC DE-GASSER

FIELD OF THE INVENTION

The field of the invention relates generally to gas/liquid separation, and specifically to a cyclonic de-gasser that uses centripetal force to separate the gas from the liquid.

BACKGROUND OF THE INVENTION

Gas/liquid separators are used to remove free gasses from a liquid; for example, the removal of radon, ozone, and carbon dioxide from water. This type of process is often used in sewage treatment, water purification, and other industrial applications. There are numerous methods for removing a free gas from a liquid. One such methodology is to introduce the gas/liquid mixture into a cylindrical vessel and then spin the vessel along its long axis. Centrifugal force causes the heavier liquid to move towards the outer wall of the container while the lighter gas moves inward. The residual/gas liquid mixture flows out of the vessel. The problem with this method of separation is that it is highly inefficient and results in less than 50% of the gas being removed from the mixture. Using a conical vessel increases efficiency to about 50%. Separation efficiency is improved by increasing the size of the separating vessel or using several smaller vessels sequentially. Both of these options, however, require a larger and more expensive device.

U.S. Pat. No. 5,203,891 issued to Lema discloses a gas/liquid separator which includes a hollow cylindrical separator body having an inlet port for receiving a flow of gas/liquid mixture and an outlet port to allow separated liquid to flow out of the system. While superior to some of the other prior art systems, the Lema device still does not provide a high enough separation efficiency.

U.S. Pat. No. 4,940,473 issued to Benham discloses a cyclonic solids separator and de-gasifier which includes a cylindrical portion secured to a cone portion, which converges inward toward the axis of the vessel and downward toward the bottom thereof. This forms a cyclone vortex chamber that forces the water to spin at a higher velocity as it travels downward, thus forcing solids which are directed outward and downward by the velocity to be separated from the liquid. The cone portion of Benham pertains to the portion of the invention which separates solids, and does not de-gassify.

Likewise, British Patent No. 768,537 issued to Freeman et al. discloses a gas and solids separator having a single conic portion. Again, only a single cone or frusto-conical portion is employed and this cone is more relevant to solids separation than de-gassing.

There is a need for a compact de-gassing system capable of removing bubbles from a pressurized process stream with minimal head loss. There is a further need for a de-gassing system which avoids pressure fluctuations in the process stream. There is yet a further need for a de-gassing system which incorporates a self-flushing design so as to avoid the build-up of solid matter.

SUMMARY OF THE INVENTION

The present invention is a cyclonic de-gasser which is employed to remove free gases from a liquid. The invention is comprised of two concentric cones with a tapering annulus therebetween. The liquid stream to be de-gassed enters the inlet under pressure from a fluid pump and passes downwardly in the tapered annulus. The inner surface of the outer cone has a plurality of stator vanes thereon which minimize turbulence of the liquid and maintain helical flow. The outer surface of the inner cone has a plurality of orifices therein to receive gas bubbles. The outer surface of the inner cone is preferably roughened to thicken the gas boundary layer of this surface such that gas bubbles are more readily trapped thereon. The unit imparts a downward helical motion to the liquid flow between the outer cone and the inner cone. The spiral motion of the liquid imparts angular momentum to the gas bubbles that increase as the cones narrow to cause the entrained bubbles to migrate toward the inner cone, where they are captured on the surface thereof and passed through the orifices therein where the gases are then vented to atmosphere through the top of the unit. The tapering annulus between the two cones creates a horizontal centripetal gradient ranging from 0.05 G at the entrance to 0.35 G at the exit. The annular width decreases with depth, increasing the centripetal forces and decreasing bubble migration path length.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
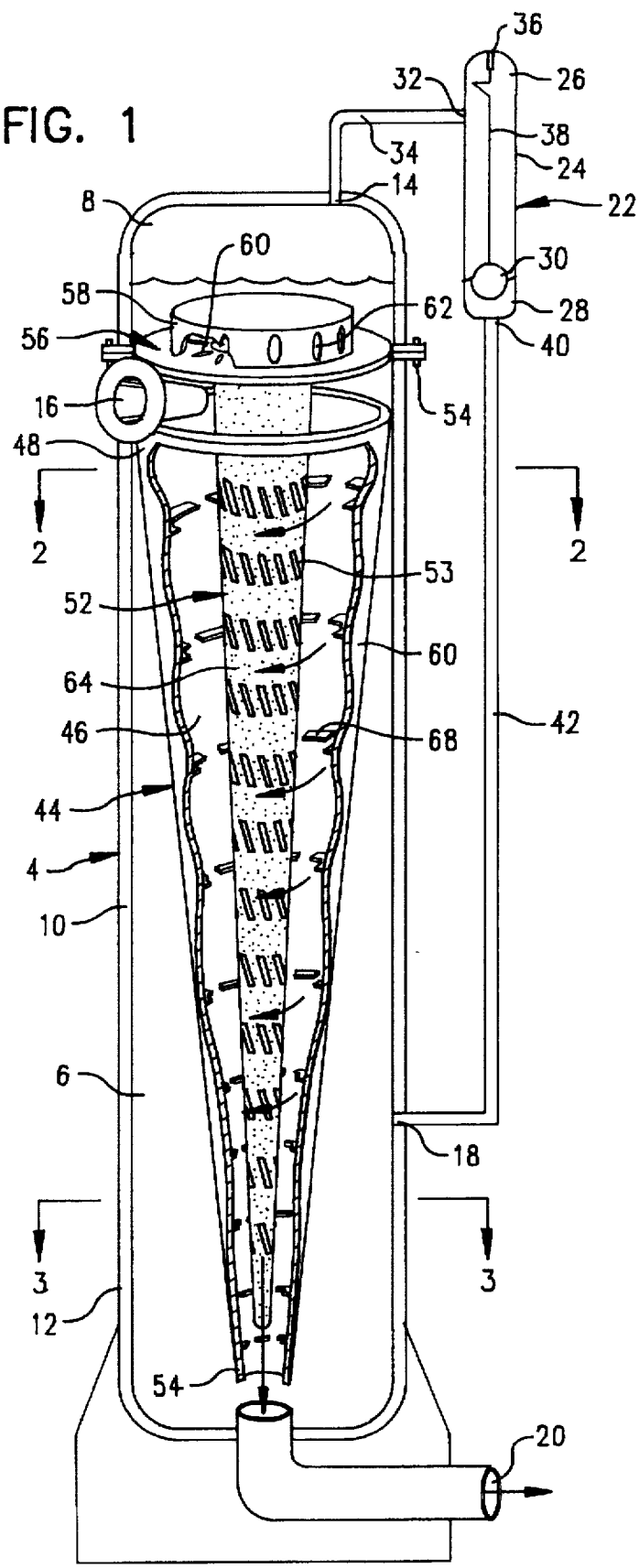
FIG. 1 is a partially exposed perspective view of the cyclonic de-gasser of the present invention.

Referring now to the drawings, and in particular to FIG. 1, cyclonic de-gasser 2 has a hollow, substantially cylindrically-shaped pressure vessel 4 having an inner portion 6, a top portion 8, a mid-body portion 10, and a bottom portion 12. The pressure vessel has four apertures therein: a gas outlet 14 passing through the upper end of top portion 8 of pressure vessel 4, a fluid inlet 16 passing through a side of top portion 8 of the pressure vessel 4, a fluid level measurement outlet 18 passing through a wall of the mid-body portion 10 of pressure vessel 4, and a fluid outlet 20 passing through the bottom end of the bottom portion 12 of pressure vessel 4.

The cyclonic de-gasser 2 is also comprised of a pressure regulating vessel 22. Pressure regulating vessel 22 is cylindrically-shaped and has a hollow inner portion 24, a top portion 26, and a bottom portion 28. Pressure regulating vessel 22 has a gas inlet 32 which is connected to gas outlet port 14 through gas line 34. The top of pressure regulating vessel 22 has a gas release vent 36 that is connected by float connecting rod 38 to a float 30 placed in the bottom portion 28 of the hollow inner portion 24 of the pressure regulating vessel 22. In the bottom of the pressure regulating vessel there is a fluid level measurement inlet 40. Fluid level measurement inlet 40 is connected by fluid level measurement line 42 to the fluid level measurement outlet 18 in pressure vessel 4. Because of the gas and liquid connections between pressure regulating vessel 22 and pressure vessel 4 through gas line 34 and fluid level measurement line 42 the fluid level in pressure regulating vessel 22 is the same as the fluid level in pressure vessel 4. Gas release vent 36 opens when float 30 drops below a predetermined level and float connecting rod 38 pulls down on the gas release vent 36. The control of the gas release vent 36 results in continuous gas release and prevents fluctuations in the process stream.

Inside pressure vessel 4 a hollow, substantially conic-shaped outer body 44 is centrally oriented. The term "substantially conic-shaped" as used throughout is intended to encompass both conic and frusto-conic shaped elements. The outer body has an inner surface 46, a top portion 48, and a bottom portion 50. A hollow, substantially conic-shaped inner body 52 is centrally oriented within outer body 44. The inner body 52 has a top portion 54 comprised of a disk segment 56 and a cylinder segment 58. The disk segment 56 fits over the inner body 52 and is centrally oriented. The cylinder segment 58 is centrally oriented on the disk segment 56. Disk segment 56 is also provided with a plurality of apertures 60 which are radially oriented around the central axis of the disk 56. The cylinder segment 58 also has a plurality of apertures 62 circumferentially oriented around the sides of the cylinder segment 58. The inner body 52 is also provided with a series of gas inlets 53 which allow communication between the outer surface 64 and the interior 66 of inner body 52. The outer surface 64 of inner body 52 is roughened to increase the depth of the adherent hydraulic boundary layer, improving bubble collection efficiency. The inner surface 46 of the outer body 44 is provided with a series of arcuate segments 68 helically disposed on the inner surface 46 of outer body 44. The arcuate segments 68 prevent hydraulic short-circuiting and minimize turbulence.

In constructing the cyclonic de-gasser 2 all the water contact surfaces should be comprised of a corrosion resistant material. There are numerous well known materials in the prior including, metals, plastics, and ceramics. As only the pressure vessel 4 needs to be rated to the operational pressure it may be desirable to construct the pressure vessel 4 from a suitable metal. As the conic shaped inner and outer bodies, 52 and 44 respectively, can be constructed separately they may be made from a suitable synthetic polymer.

Figure 2:
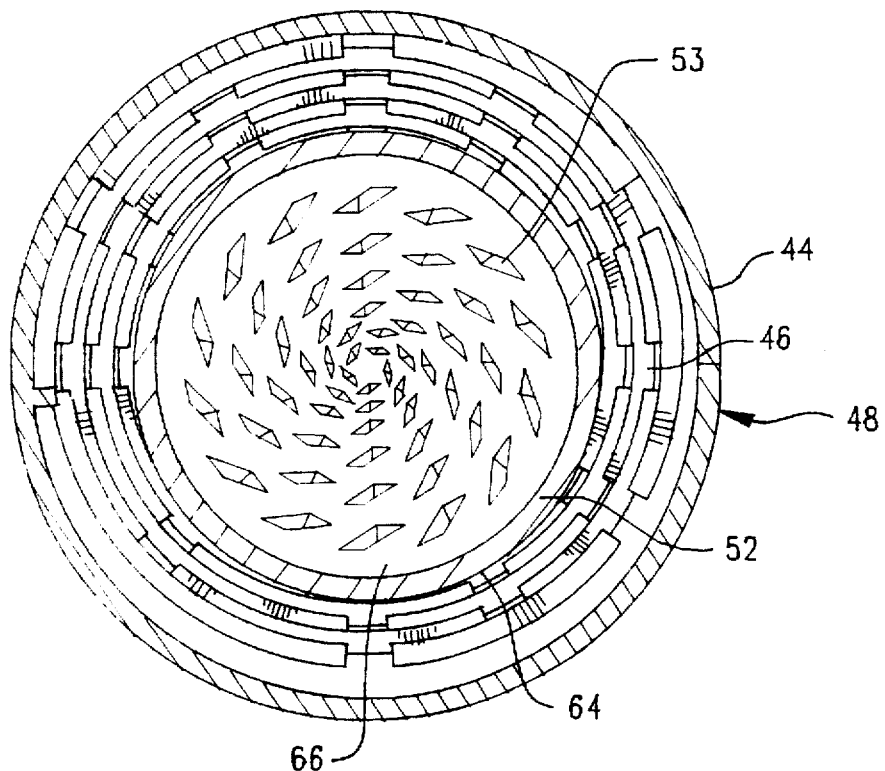
FIG. 2 is a cross-sectional view of the cyclonic de-gasser of the present invention taken along line 2—2.
Figure 3:
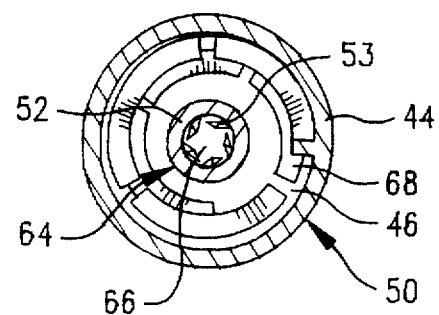
FIG. 3 is a cross-sectional view of the cyclonic de-gasser of the present invention taken along line 3—3.

In operation of the cyclonic de-gasser 2, a gas/liquid combination is pumped into pressure vessel 4 via tangentially positioned fluid inlet 16. The gas/liquid combination passes between the conic-shaped outer body 44 and the conic-shaped inner body 52 and is imparted a predetermined angular momentum by the relative orientation of the inner and outer conic-shaped bodies, 52 and 44 respectively. This causes gas from the gas/liquid combination to first pass through the gas inlets 53 and into the interior 66, illustrated in FIGS. 2 and 3, of conic-shaped inner body 52. The tapering annulus between outer body 44 and inner body 52 creates a vertical centripetal gradient, or an increase in the angular momentum of the gas bubbles, ranging from 0.05 G at the top portions of the outer and inner bodies, 48 and 54 respectively, to 0.35 G at bottom portion 12. The annular width decreases with depth, increasing the centripetal forces and decreasing bubble migration path length. The gas rising through interior section 66 is expelled through the top portion 54 of conic-shaped inner body 52 through the disk apertures 60 and cylinder apertures 62. It then forms a gas reservoir in the top portion 8 of pressure vessel 4. The gas flows out gas outlet port 14, through gas line 34 and into pressure regulating vessel 22. At the same time, fluid which has had gas removed from it flows out the bottom of conic-shaped outer body 44 and then out of the fluid outlet 20. A portion of the fluid also flows out of fluid level measurement outlet 18, then through fluid level measurement line 42, through fluid measurement inlet 40, and into bottom portion 28 of pressure regulating vessel 22 where it provides buoyancy for float 30. Float 30 in turn is connected by float rod 38 to pressure regulating gas release vent 36. As the build-up of gas forces the water level down in pressure vessel 4, the water level will also drop in pressure regulating vessel 22 because the gas pressure in both the top portion 26 of the pressure regulating vessel and top portion 8 of the pressure vessel is the same. As the pressure in the pressure regulating vessel increases due to the transfer of gas from the pressure vessel to the pressure regulating vessel, the water level in the pressure regulating vessel decreases, thereby moving float 30 down and causing it to pull on float rod 38. Once the level drops to a predetermined point, rod 38 will actuate the release of gas from gas release vent 36.

The above described invention was built with the pressure vessel 4 having a diameter of approximately 9 and a length of approximately 48 inches. Fluid inlet 16 and fluid outlet 20 both had a diameter of 1.5 inches. When operated at a flow rate of 25 gallons per minute the device resulted in a 90% removal of 1 millimeter diameter bubbles with head losses of less than 10% and a maximum scour velocity of the device was 5 feet per minute.

From the foregoing teachings, it can be appreciated by one skilled in the art that a new, novel, and nonobvious cyclonic de-gasser which is employed to remove free gases from a liquid has been disclosed. It is to be understood that numerous alternatives and equivalents will be apparent to those of ordinary skill in the art, given the teachings herein, such that the present invention is not to be limited by the foregoing description but only by the appended claims.

I claim:

1. A gas/liquid separator comprising:

a hollow, substantially conic-shaped outer body having an inner surface, a top portion, and a bottom portion, said top portion having a fluid inlet adjacent thereto, said bottom portion having a fluid outlet adjacent thereto;

a hollow, substantially conic-shaped inner body oriented within said hollow, substantially conic-shaped outer body, said hollow, substantially conic-shaped inner body having a top portion, an outer surface and an interior, said hollow, substantially conic-shaped inner body having a plurality of gas inlets such that a gas/liquid combination entering said fluid inlet passes between said hollow, substantially conic-shaped outer body and said hollow, substantially conic-shaped inner body and is imparted a predetermined angular momentum by the relative orientation of said hollow, substantially conic-shaped outer body with respect to said hollow, conic-shaped inner body to cause gas from the gas/liquid combination to first pass through said gas inlets and into said interior of said hollow, substantially conic-shaped inner body and then rise to be expelled through said top portion of said hollow, substantially conic-shaped inner body, the predetermined angular momentum of the gas/liquid composition increasing from said top portion to said bottom portion of said hollow, substantially conic-shaped outer body; and a hollow pressure vessel having a gas outlet port, a fluid inlet, a fluid level measurement outlet, and a fluid outlet with said hollow, substantially conic-shaped outer body and said hollow, substantially conic-shaped inner body oriented in said hollow pressure vessel.

2. The separator of claim 1 further comprising a pressure regulating means in communication with said fluid level measurement outlet of said hollow pressure vessel.

3. The separator of claim 1 further comprising a plurality of arcuate segments helically disposed on said inner surface of said hollow, substantially conic-shaped outer body to minimize turbulence of the gas/liquid composition.

4. A gas/liquid separator comprising:

a hollow, substantially conic-shaped outer body having an inner surface, a top portion, and a bottom portion, said top portion having a fluid inlet adjacent thereto, said bottom portion having a fluid outlet adjacent thereto;

a hollow, substantially conic-shaped inner body oriented within said hollow, substantially conic-shaped outer body, said hollow, substantially conic-shaped inner body having a top portion, an outer surface and an interior, said hollow, substantially conic-shaped inner body having a plurality of gas inlets such that a gas/liquid combination entering said fluid inlet passes between said hollow, substantially conic-shaped outer body and said hollow, substantially conic-shaped inner body and is imparted a predetermined angular momentum by the relative orientation of said hollow, substantially conic-shaped outer body with respect to said hollow, conic-shaped inner body to cause gas from the gas/liquid combination to first pass through said gas inlets and into said interior of said hollow, substantially conic-shaped inner body and then rise to be expelled through said top portion of said hollow, substantially conic-shaped inner body, the predetermined angular momentum of the gas/liquid composition increasing from said top portion to said bottom portion of said hollow, substantially conic-shaped outer body; and a plurality of arcuate segments helically disposed on said inner surface of said hollow, substantially conic-shaped outer body to minimize turbulence of the gas/liquid composition.

5. The separator of claim 4 further comprising a hollow pressure vessel having a gas outlet port, a fluid inlet, a fluid level measurement outlet, and a fluid outlet with said hollow, substantially conic-shaped outer body and said hollow, substantially conic-shaped inner body oriented in said hollow pressure vessel.

6. The separator of claim 5 further comprising a pressure regulating means in communication with said fluid level measurement outlet of said hollow pressure vessel.

7. A gas/liquid separator comprising:

a hollow pressure vessel having a gas outlet port, a fluid inlet, a fluid level measurement outlet, and a fluid outlet;

pressure regulating means in communication with said fluid level measurement outlet of said hollow pressure vessel;

a hollow, substantially conic-shaped outer body having an inner surface, a top portion, and a bottom portion, said top portion having a fluid inlet adjacent thereto, said bottom portion having a fluid outlet adjacent thereto;

a hollow, substantially conic-shaped inner body oriented within said hollow, substantially conic-shaped outer body, said hollow, substantially conic-shaped inner body having a top portion, an outer surface and an interior, said hollow, substantially conic-shaped inner body having a plurality of gas inlets such that a gas/liquid combination entering said fluid inlet passes between said hollow, substantially conic-shaped outer body and said hollow, substantially conic-shaped inner body and is imparted a predetermined angular momentum by the relative orientation of said hollow, substantially conic-shaped outer body with respect to said hollow, conic-shaped inner body to cause gas from the gas/liquid combination to first pass through said gas inlets and into said interior of said hollow, substantially conic-shaped inner body and then rise to be expelled through said top portion of said hollow, substantially conic-shaped inner body, the predetermined angular momentum of the gas/liquid composition increasing from said top portion to said bottom portion of said hollow, substantially conic-shaped outer body; and a plurality of arcuate segments helically disposed on said inner surface of said hollow, substantially conic-shaped outer body to minimize turbulence of the gas/liquid composition.

8. A gas/liquid separator comprising:

a hollow, substantially conic-shaped outer body having an inner surface, a top portion, and a bottom portion, said top portion having a fluid inlet adjacent thereto, said bottom portion having a fluid outlet adjacent thereto;

a hollow, substantially conic-shaped inner body oriented within said hollow, substantially conic-shaped outer body, said hollow, substantially conic-shaped inner body having a top portion, an outer surface and an interior, said hollow, substantially conic-shaped inner body having a plurality of gas inlets such that a gas/liquid combination entering said fluid inlet passes between said hollow, substantially conic-shaped outer body and said hollow, substantially conic-shaped inner body and is imparted a predetermined angular momentum by the relative orientation of said hollow, substantially conic-shaped outer body with respect to said hollow, conic-shaped inner body to cause gas from the gas/liquid combination to first pass through said gas inlets and into said interior of said hollow, substantially conic-shaped inner body and then rise to be expelled through said top portion of said hollow, substantially conic-shaped inner body, the predetermined angular momentum of the gas/liquid composition increasing from said top portion to said bottom portion of said hollow, substantially conic-shaped outer body; and a plurality of arcuate segments helically disposed on said inner surface of said hollow, substantially conic-shaped outer body to minimize turbulence of the gas/liquid composition.

9. The separator of claim 8 further comprising a hollow pressure vessel having a gas outlet port, a fluid inlet, a fluid level measurement outlet, and a fluid outlet with said hollow, substantially conic-shaped outer body and said hollow, substantially conic-shaped inner body oriented in said hollow pressure vessel.

10. The separator of claim 9 further comprising a pressure regulating means in communication with said fluid level measurement outlet of said hollow pressure vessel.

* * * * *